United States Patent
Tsutsumi

(10) Patent No.: US 9,631,531 B2
(45) Date of Patent: Apr. 25, 2017

(54) REGENERATION ABNORMALITY DETERMINATION DEVICE FOR PARTICULATE FILTER

(71) Applicant: HINO MOTORS, LTD., Hino-shi (JP)

(72) Inventor: Munechika Tsutsumi, Tokyo (JP)

(73) Assignee: HINO MOTORS, LTD., Hino-shi (JP)

(*) Notice: Subject to any disclaimer, the term of this patent is extended or adjusted under 35 U.S.C. 154(b) by 0 days.

(21) Appl. No.: 14/888,546

(22) PCT Filed: Jul. 8, 2014

(86) PCT No.: PCT/JP2014/068180
§ 371 (c)(1),
(2) Date: Nov. 2, 2015

(87) PCT Pub. No.: WO2015/005338
PCT Pub. Date: Jan. 15, 2015

(65) Prior Publication Data
US 2016/0108783 A1 Apr. 21, 2016

(30) Foreign Application Priority Data
Jul. 10, 2013 (JP) .................. 2013-144157

(51) Int. Cl.
*F01N 3/00* (2006.01)
*F01N 3/025* (2006.01)
(Continued)

(52) U.S. Cl.
CPC .......... *F01N 3/0253* (2013.01); *F01N 3/035* (2013.01); *F01N 9/002* (2013.01); *F01N 11/002* (2013.01);
(Continued)

(58) Field of Classification Search
USPC .................. 60/286, 295, 297, 303, 311
See application file for complete search history.

(56) References Cited

U.S. PATENT DOCUMENTS 7,104,049 B2* 9/2006 Hiranuma ............ B01D 53/96
60/274
7,628,010 B2* 12/2009 Kurata .................. F01N 3/0231
60/286
(Continued)

FOREIGN PATENT DOCUMENTS

JP 2003 193824 7/2003
JP 2005 315198 11/2005
(Continued)

OTHER PUBLICATIONS

International Search Report Issued Sep. 2, 2014, in PCT/JP14/68180 Filed Jul. 8, 2014.

*Primary Examiner* — Binh Q Tran
(74) *Attorney, Agent, or Firm* — Oblon, McClelland, Maier & Neustadt, L.L.P.

(57) ABSTRACT

A device for determining a regeneration abnormality of a particulate filter has a temperature sensor detecting an exhaust temperature on an entry side of a particulate filter and a controller feedback controlling an injection amount of fuel to be added to a fuel addition valve to keep the exhaust temperature on the entry side of the particulate filter to a target regeneration temperature upon forced regeneration in a predetermined temperature range around the target regeneration temperature. The controller is configured to calculate the exhaust temperature on the entry side of the particulate filter based on the commanded injection amount to the fuel addition valve and detect any abnormality in feedback control based on deviation between the calculated exhaust temperature on the entry side of the particulate filter and the actually measured value by the temperature sensor.

1 Claim, 4 Drawing Sheets

(51) Int. Cl.
    *F02D 41/02*     (2006.01)
    *F02D 41/14*     (2006.01)
    *F01N 9/00*     (2006.01)
    *F01N 11/00*     (2006.01)
    *F01N 3/035*     (2006.01)
    *F02D 41/22*     (2006.01)

(52) U.S. Cl.
    CPC ....... *F02D 41/029* (2013.01); *F02D 41/1446* (2013.01); *F02D 41/1447* (2013.01); *F01N 2900/1602* (2013.01); *F02D 41/221* (2013.01); *F02D 2200/0802* (2013.01); *F02D 2200/0804* (2013.01); *Y02T 10/47* (2013.01)

(56) References Cited

U.S. PATENT DOCUMENTS

| | | | |
|---|---|---|---|
| 8,490,388 B2 * | 7/2013 | Parmentier | F01N 3/103 |
| | | | 60/286 |
| 8,893,474 B2 * | 11/2014 | Ikawa | B01D 53/9495 |
| | | | 60/285 |
| 9,046,017 B2 * | 6/2015 | Nakazato | F02D 41/0245 |
| 2005/0241301 A1 | 11/2005 | Okugawa et al. | |
| 2013/0269427 A1 | 10/2013 | Nagaoka et al. | |

FOREIGN PATENT DOCUMENTS

| | | |
|---|---|---|
| JP | 2006 022730 | 1/2006 |
| JP | 2012 127301 | 7/2012 |

* cited by examiner

REGENERATION ABNORMALITY DETERMINATION DEVICE FOR PARTICULATE FILTER

TECHNICAL FIELD

The present invention relates to a device for determining any regeneration abnormality of a particulate filter.

BACKGROUND ART

Particulates (particulate matter) discharged from a diesel engine are mainly constituted by carbonic soot and a soluble organic fraction (SOF) of high-boiling hydrocarbon and contain a trace of sulfate (misty sulfuric acid fraction). In order to reduce such particulates, conventionally a particulate filter has been incorporated in an exhaust pipe through which exhaust gas flows.

Such particulate filter has a porous honeycomb structure made of ceramics such as cordierite and having lattice-like compartmentalized passages; alternate ones of the passages have plugged inlets and the remaining passages with unplugged open inlets have plugged outlets. Discharged downstream is only the exhaust gas passing through thin porous walls compartmentalizing the respective passages.

The particulates in the exhaust gas, which are captured and accumulated on inner surfaces of the thin porous walls, require to be burned off for regeneration of the particulate filter before exhaust resistance increases due to clogging. However, in the diesel engine in a normal operation status, the exhaust gas has little chance to reach a temperature level at which the particulates ignite by themselves.

In order to overcome this, an oxidation catalyst comprising alumina carrying platinum and added with an appropriate amount of rare earth element such as cerium is integrally carried by the particulate filter. The oxidation catalyst facilitates an oxidation reaction of particulates captured by the particulate filter to lower an ignition temperature, so that the particulates can be burned off even at an exhaust temperature level lower than ever before.

However, even in such a case, a captured amount of the particulates may exceed a treated amount in an operation area having a lower exhaust temperature level. Continued operation at such lower exhaust temperature level may hinder sufficient regeneration of the particulate filter, resulting in excessive accumulation of the captured particulates in the particulate filter. Thus, when an amount of accumulated particulates has increased, it is necessary to forcibly heat the particulate filter to burn off the captured particulates.

More specifically, it has been conceived that a flow-through type oxidation catalyst is arranged in front of the particulate filter and a fuel addition valve is incorporated in the exhaust pipe upstream of the oxidation catalyst and that fuel added by the fuel addition valve is caused to make oxidization reaction through the oxidation catalyst and the exhaust gas elevated in temperature by resultant reaction heat is guided to the particulate filter to increase a catalyst bed temperature to thereby burn off the particulates, resulting in regeneration of the particulate filter.

With respect to this kind of forced regeneration of a particulate filter, there exists, for example, undermentioned Patent Literature 1 by the applicant same as that of the present invention.

CITATION LIST

Patent Literature

Patent Literature 1: JP 2003-193824A

SUMMARY OF INVENTION

Technical Problems

Recently obliged in countries is equipment of a so-called on-board diagnosis device (OBD) to a vehicle to monitor any failure in an exhaust gas countermeasure system; upon failure occurrence, it turns on a warning light or the like for announcement of the failure occurrence to a driver and records details of the failure. It has been also desired to make it possible to monitor whether regeneration control of a particulate filter is normally conducted or not.

Specifically, upon forced regeneration of the particulate filter, feedback control has been conducted so as to keep an exhaust temperature on an entry side of the particulate filter to a target regeneration temperature. However, if failure occurs due to, for example, foreign matter being caught by a moving part of a fuel addition valve, a deviation may occur between commanded and actual injection amounts of fuel to be added, possibly resulting in no normal regeneration control of the particulate filter.

The invention was made in view of the above and has its object to provide a device for determining any regeneration abnormality of a particulate filter which is capable of detecting any abnormality in feedback control so as to keep an exhaust temperature on an entry side of the particulate filter to a target regeneration temperature upon forced regeneration.

Solution to Problems

The invention is directed to a device for determining any regeneration abnormality of a particulate filter having an oxidation catalyst in front thereof, fuel being added upstream of said oxidation catalyst by a fuel addition valve to undergo oxidation reaction on said oxidation catalyst, whereby resultant reaction heat makes forced regeneration of burning off captured particulates, characterized in that it comprises a temperature sensor for detecting an exhaust temperature on an entry side of said particulate filter and a controller for feedback controlling an injection amount, by said fuel addition valve, of the fuel to be added on the basis of an actually measured value by said temperature sensor within a predetermined temperature range around said target regeneration temperature so as to keep the exhaust temperature on the entry side of said particulate filter to the target regeneration temperature upon the forced regeneration, said controller being configured to simulatedly calculate the exhaust temperature on the entry side of the particulate filter on the basis of a commanded injection amount to said fuel addition valve and determine any abnormality of the feedback control on the basis of a deviation between the calculated exhaust temperature on the entry side of the particulate filter and the actually measured value by said temperature sensor.

In this case, if the feedback control is normally conducted within the predetermined temperature range around the target regeneration temperature upon the forced regeneration of the particulate filter, then the actually measured value by the temperature sensor and the calculated exhaust temperature on the entry side of the particulate filter derived by simulated calculation of the exhaust temperature on the basis of the commanded injection amount to the fuel addition valve have no great deviation therebetween and are substantially the same within a tolerance. However, if any failure occurs due to, for example, foreign matter being caught by a moving part of the fuel addition valve, then a deviation appears between the actual and commanded injection amounts of fuel to be added, failing in normal regeneration control of the particulate filter, which appears as a phenomenon that there is a great deviation between the actually measured value by the temperature sensor and the calculated exhaust temperature on the entry side of the particulate filter. Thus, based on the deviation, abnormality in the feedback control is detected by the controller to thereby reveal that the regeneration control of the particulate filter has abnormality.

For simulated calculation of the exhaust temperature on the entry side of the particulate filter on the basis of the commanded injection amount to the fuel addition valve, further utilized are a rotation frequency of an engine, a flow rate of exhaust gas, a vehicle speed, an outside air temperature, an atmospheric pressure and the like grasped as information in general control of the engine to thereby calculate heat of chemical reaction to be generated on an oxidation catalyst and various heats to be transferred (heat release by travel wind and heats to be transferred to an exhaust pipe and to a filter casing). It suffices that the various heats derived are subtracted from the heat of the chemical reaction derived to calculate the temperature of the exhaust gas on the entry side of the particulate filter.

In the invention, the controller is preferably configured to determine the feedback control to have abnormality when one and the other of the actually measured value by the temperature sensor and the calculated exhaust temperature on the entry side of the particulate filter oppositely increases and decreases, respectively, and the increasing one exceeds a high-temperature-side threshold and the decreasing one falls below a low-temperature-side threshold.

Specifically, when the feedback control is normally conducted upon forced regeneration of the particulate filter, it is natural that the actually measured value by the temperature sensor and the calculated exhaust temperature on the entry side of the particulate filter similarly increase/decrease. It is clearly an abnormal phenomenon that one and the other of the actually measured value by the temperature sensor and the calculated exhaust temperature on the entry side of the particulate filter oppositely increases and decreases, respectively. Even more, a fact that the increasing one exceeds a high-temperature-side threshold and the decreasing one falls below a low-temperature-side threshold indicates that it is not a temporary variation due to mere disturbance and thus the feedback control is determined to have abnormality.

Advantageous Effects of Invention

A device for determining any regeneration abnormality of a particulate filter according to the invention as mentioned in the above can exhibit excellent effects that abnormality can be detected in the feedback control of keeping an exhaust temperature on an entry side of a particulate filter to a target regeneration temperature upon forced regeneration so that regeneration control of the particulate filter being not normally conducted can be grasped, whereby a measure such as inspection of the fuel addition valve can be instantly taken to early solve a problem of the regeneration of the particulate filter not normally conducted being left as it is.

DESCRIPTION OF EMBODIMENT

Next, an embodiment of the invention will be described in conjunction with drawings.

Figure 1:
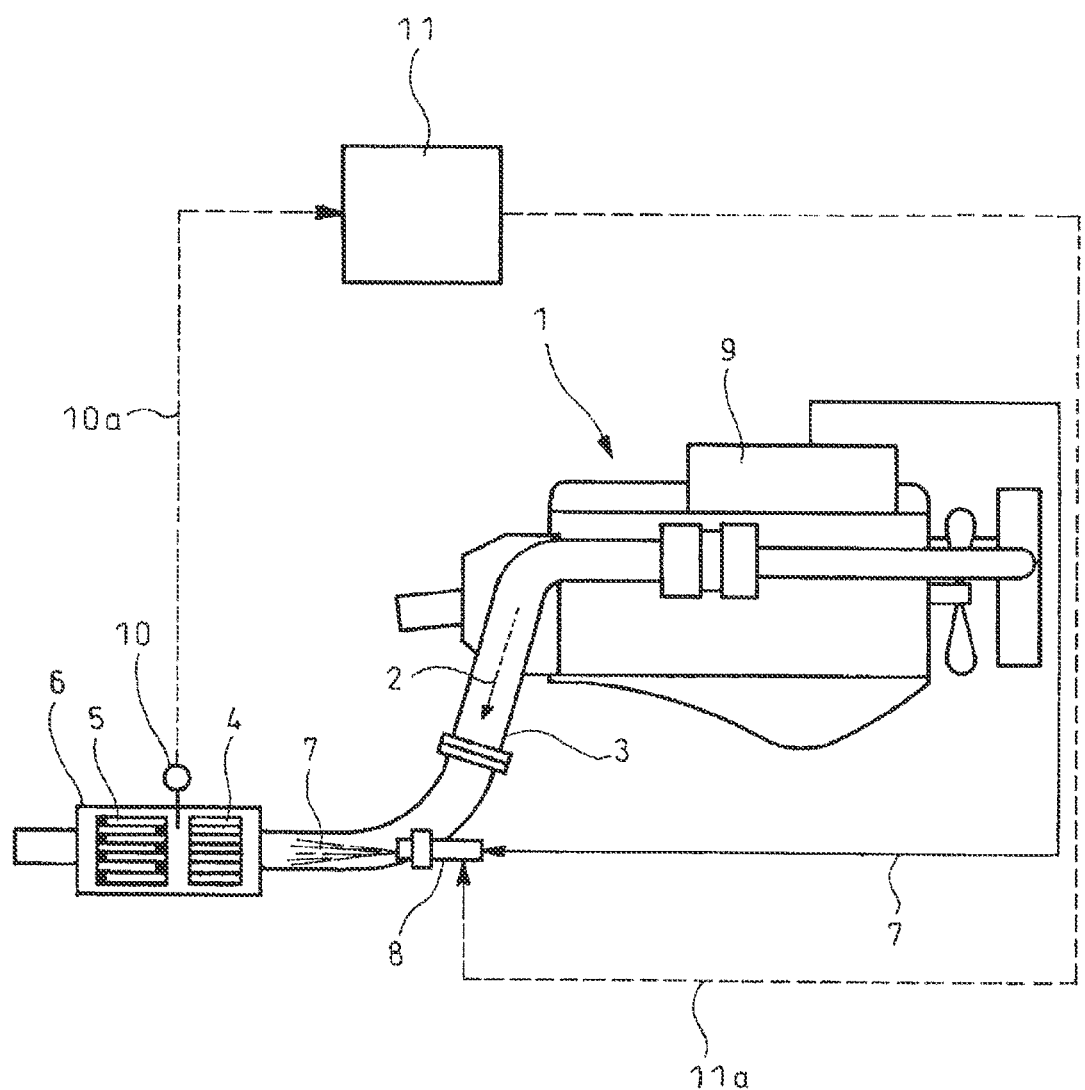
FIG. 1 is a schematic diagram showing an embodiment of the invention.

FIG. 1 shows the embodiment of the invention in which exhaust gas 2 from an engine 1 is discharged through an exhaust pipe 3 to outside of a vehicle. Incorporated in the exhaust pipe 3 is a particulate filter 5 encased by a filter casing 6 and having an oxidation catalyst 4 in front of the same.

Incorporated in the exhaust pipe 3 upstream of the filter casing 6 is a fuel addition valve 8 which adds fuel 7 for regeneration of the particulate filter 5 in a step where an accumulated amount of the particulates in the particulate filter 5 has increased. The fuel 7 is guided from a fuel pump 9 to the fuel addition valve 8.

Arranged in the filter casing 6 between the oxidation catalyst 4 and the particulate filter 5 is a temperature sensor 10 which detects an exhaust temperature on an entry side of the particulate filter 5 and from which a detection signal 10a is inputted to a controller 11. In the controller 11, in order to keep the exhaust temperature on the entry side of the particulate filter 5 to a target regeneration temperature upon forced regeneration, an injection amount of fuel to be added by the fuel addition valve 8 is feedback controlled through a control signal 11a on the basis of the actually measured value by the temperature sensor 10 in a predetermined temperature range around the target regeneration temperature.

Figure 2:
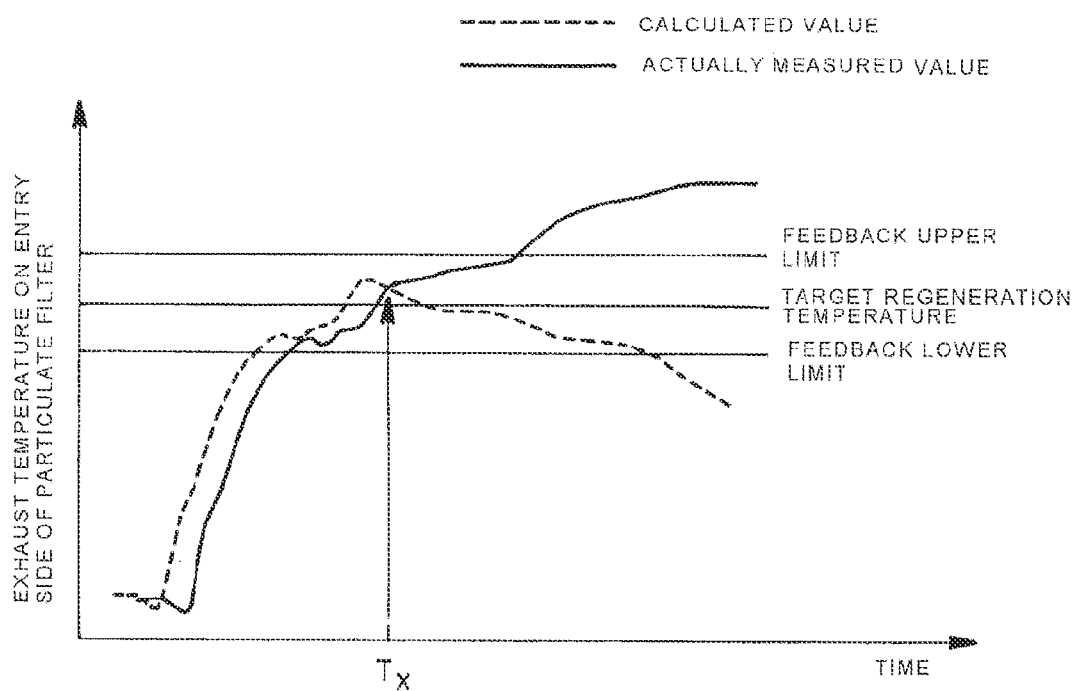
FIG. 2 is a graph on an deviation between calculated and actually measured values of exhaust temperature on an entry side of a particulate filter.

Specifically, as shown in the graph of FIG. 2, the feedback control of the fuel addition valve 8 with respect to the injection amount of the fuel to be added is conducted during the exhaust temperature on the entry side of the particulate filter 5 being within the predetermined temperature range defined by feedback upper and lower limits with the target regeneration temperature therebetween. During the exhaust temperature falling blow the feedback lower limit, the control is made on the basis of the injection amount of the flue to be added which is read out depending on an operational condition from, for example, a two-dimensional control map of load and rotation frequency of engine; when the exhaust temperature exceeds the feedback lower limit, then the exhaust temperature is regarded as sufficiently high temperature to stop the fuel addition.

Moreover, the controller 11 simulatedly calculates the exhaust temperature on the entry side of the particulate filter 5 on the basis of the commanded injection amount to the fuel addition valve 8 and detects any abnormality in the feedback control on the basis of the deviation between the calculated exhaust temperature on the entry side of the particulate filter and the actually measured value by the temperature sensor 10. More specifically, the feedback control is determined to have abnormality when one and the other of the calculated exhaust temperature on the entry side of the particulate filter 5 and the actually measured value by the temperature sensor 10 are oppositely increased and decreased, respectively, and the increasing one exceeds the high-temperature-side threshold and the decreasing one falls below the low-temperature-side threshold.

Specifically, if the feedback control is normally conducted between the feedback upper and lower limits, the calculated exhaust temperature on the entry side of the particulate filter and the actually measured value by the temperature sensor 10 in FIG. 2 increase/decrease side by side. However, if failure occurs due to, for example, foreign matter being caught by a working part of the fuel addition valve 8 at a time point of Tx in FIG. 2, then a great deviation occurs between the calculated exhaust temperature on the entry side of the particulate filter 5 and the actually measured value by the temperature sensor 10.

Figure 3:
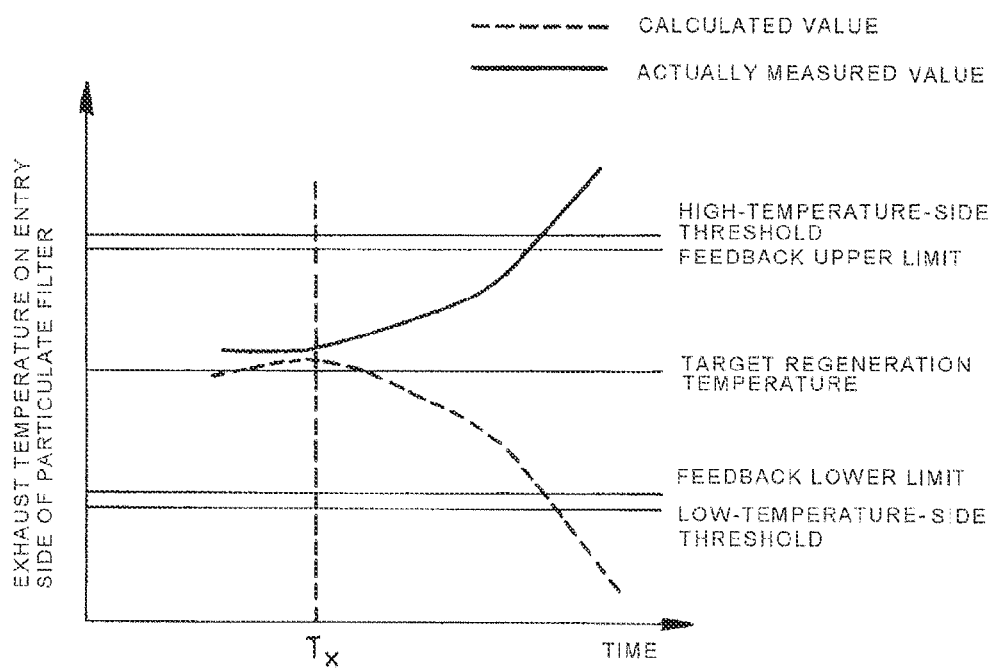
FIG. 3 is a graph showing an example of the deviation between the calculated and actually measured values of exhaust temperature on the entry side of the particulate filter.
Figure 4:
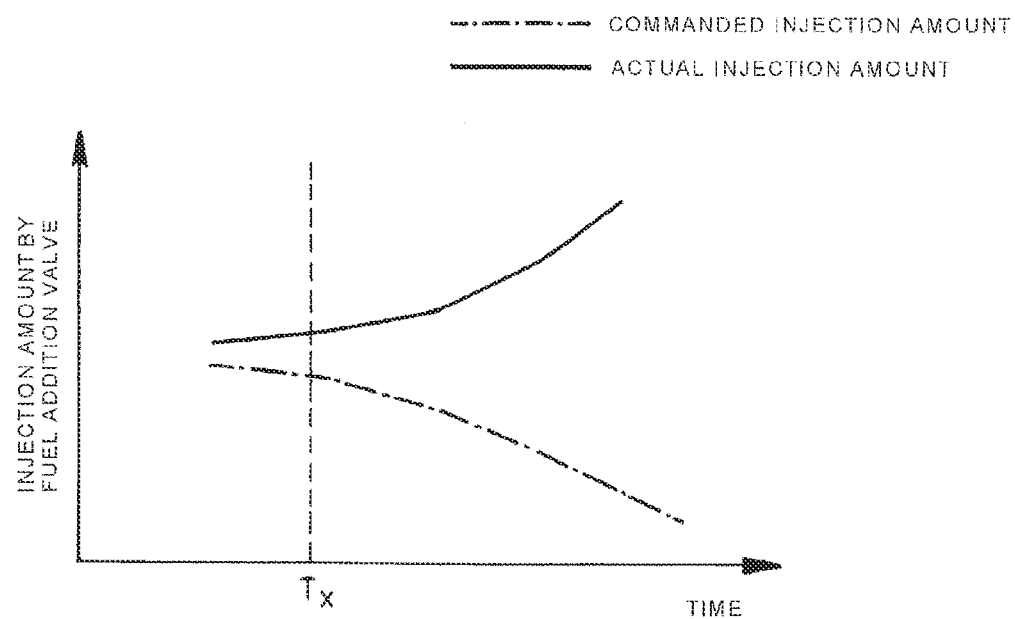
FIG. 4 is a graph on increase and decrease of actual and commanded injection amounts, respectively, in the deviation shown in FIG. 3.

For example, when the calculated exhaust temperature on the entry side of the particulate filter 5 falls below the low-temperature-side threshold and the actually measured value by the temperature sensor 10 exceeds the high-temperature-side threshold as shown in FIG. 3, the controller 11 presumes that an abnormal phenomenon is occurring in which an actual injection amount increases irrespective of the commanded injection amount being lowered as shown in FIG. 4 and determines the feedback control to have abnormality.

Figure 5:
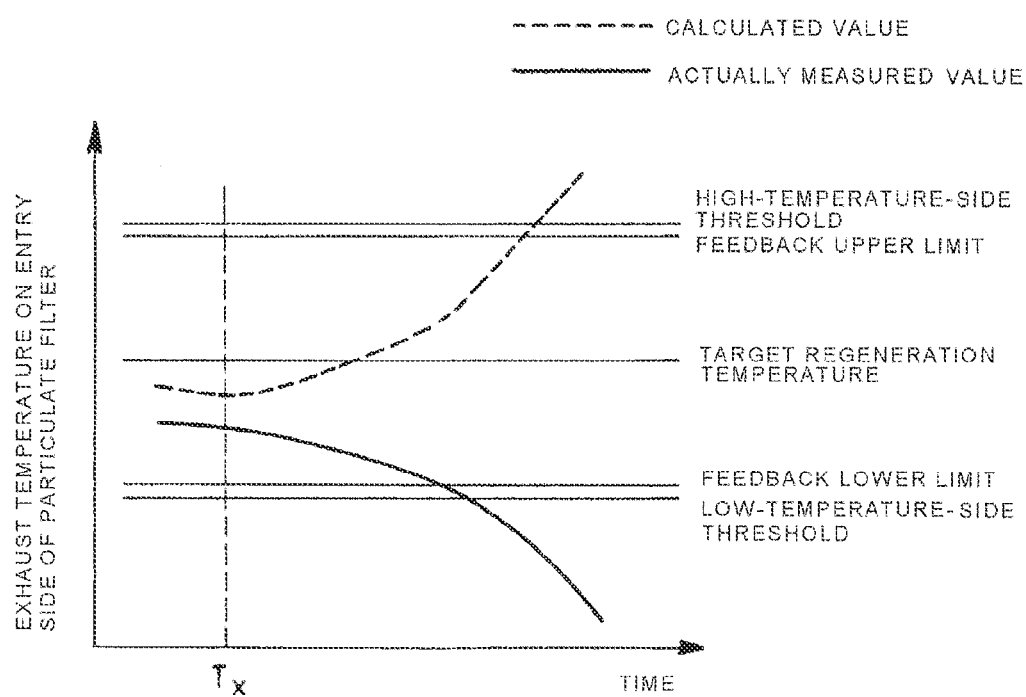
FIG. 5 is a graph showing a further example of the deviation between calculated and actually measured values of exhaust temperature on the entry side of the particulate filter.
Figure 6:
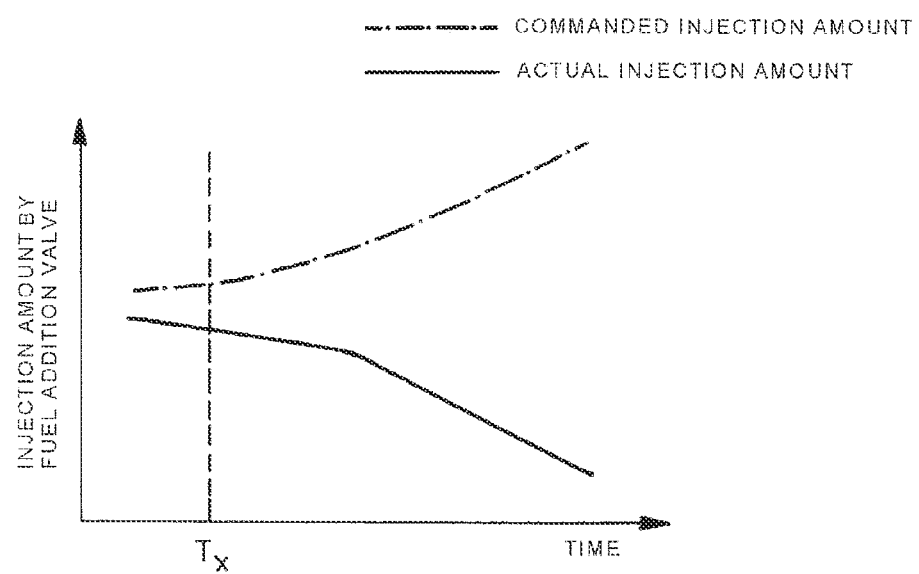
FIG. 6 is a graph on decrease and increase of the actual and commanded injection amounts, respectively, in the deviation shown in FIG. 5.

When the calculated exhaust temperature value on the entry side of the particulate filter 5 exceeds the high-temperature-side threshold and the actually measured value by the temperature sensor 10 falls below the low-temperature side threshold as shown in FIG. 5, the controller 11 presumes that an abnormal phenomenon is occurring in which the actual injection amount decreases irrespectively of the commanded injection amount being increased as shown in FIG. 6 and determines the feedback control to have abnormality.

For simulated calculation of the exhaust temperature on the entry side of the particulate filter 5 on the basis of the commanded injection amount to the fuel addition valve 8, further utilized are a rotation frequency of an engine, a flow rate of exhaust gas 2, a vehicle speed, an outside air temperature, an atmospheric pressure and the like grasped as information in general control of the engine to thereby calculate heat of chemical reaction to be generated on an oxidation catalyst 4 and various heats to be transferred (heat release by travel wind and heats to be transferred to an exhaust pipe 3 and to a filter casing 6). Then, it suffices that the various heats derived are subtracted from the heat of the chemical reaction derived to calculate the temperature of the exhaust gas 2 on the entry side of the particulate filter 5.

As mentioned in the above, if normally conducted is the feedback control within the predetermined temperature range around target regeneration temperature upon the forced regeneration of the particulate filter 5, then the actually measured value by the temperature sensor 10 and the calculated exhaust temperature on the entry side of the particulate filter 5 derived by simulated calculation of the exhaust temperature on the basis of the commanded injection amount to the fuel addition valve 8 are to have no great deviation therebetween and are to be substantially the same within a tolerance. However, if any failure occurs due to, for example, foreign matter being caught by a moving part of the fuel addition valve 8, then a deviation occurs between the actual and commanded injection amounts of fuel 7 to be added, failing in normal regeneration control of the particulate filter 5, which appears as a phenomenon of a great deviation being occurring between the actually measured value of the temperature sensor 10 and the calculated exhaust temperature on the entry side of the particulate filter. Thus, based on the deviation, abnormality in feedback control is detected by the controller 11 to thereby reveal that the regeneration control of the particulate filter 5 has abnormality.

Specifically, when the feedback control is normally conducted upon forced regeneration of the particulate filter 5, it is natural that the actually measured value by the temperature sensor 10 and the calculated exhaust temperature on the entry side of the particulate filter similarly increase/decrease. A fact that one and the other of the actually measured value by the temperature sensor 10 and the calculated exhaust temperature on the entry side of the particulate filter 5 oppositely increases and decreases, respectively, is clearly an abnormal phenomenon. Even more, a fact that the increasing one exceeds the high-temperature-side threshold and the decreasing one falls below the low-temperature-side threshold indicates that it is not a temporary variation due to mere disturbance and thus the feedback control is determined to have abnormality.

Thus, according to the above-mentioned embodiment, abnormality can be detected in feedback control of keeping an exhaust temperature on an entry side of a particulate filter to a target regeneration temperature upon forced regeneration so that regeneration control of the particulate filter being not normally conducted can be grasped, whereby a measure such as inspection of the fuel addition valve can be instantly taken to early solve a problem of the regeneration of the particulate filter not normally conducted being left as it is.

It is to be understood that a device for determining regeneration abnormality of a particulate filter according to the invention is not limited to the above embodiment and that various changes and modifications may be made without departing from the scope of the invention.

REFERENCE SIGNS LIST 2 exhaust gas
4 oxidation catalyst
5 particulate filter
7 fuel
8 fuel addition valve
10 temperature sensor
10a detection signal
11 controller
11a control signal

The invention claimed is:

1. A device for determining a regeneration abnormality of a particulate filter having an oxidation catalyst in front thereof, fuel being added upstream of said oxidation catalyst by a fuel addition valve to undergo oxidation reaction on said oxidation catalyst, whereby resultant reaction heat makes forced regeneration of burning off captured particulates, the device comprising:

a temperature sensor for detecting an exhaust temperature on an entry side of said particulate filter; and
a controller for feedback controlling an injection amount, by said fuel addition valve, of the fuel to be added on the basis of an actually measured value by said temperature sensor within a predetermined temperature range around said target regeneration temperature so as to keep the exhaust temperature on the entry side of said particulate filter to the target regeneration temperature upon the forced regeneration, said controller being configured to calculate the exhaust temperature on the entry side of the particulate filter on the basis of a commanded injection amount to said fuel addition valve and determine an abnormality of the feedback control on the basis of a deviation between the calculated exhaust temperature on the entry side of the particulate filter and the actually measured value by said temperature sensor, and said controller being configured to determine the feedback control to have the abnormality when one and the other of the actually measured value by the temperature sensor and the calculated exhaust temperature on the entry side of the particulate filter oppositely increases and decreases, respectively, and the increasing one exceeds a high-temperature-side threshold and the decreasing one falls below a low-temperature-side threshold.

* * * * *